UNITED STATES PATENT OFFICE.

GEORGE HENRY WIDNER, OF DES MOINES, IOWA.

METHOD OF PRODUCING WATER-SOFTENING MATERIAL.

1,294,007.     Specification of Letters Patent.     Patented Feb. 11, 1919.

No Drawing.     Application filed March 10, 1917. Serial No. 153,982.

*To all whom it may concern:*

Be it known that I, GEORGE H. WIDNER, a citizen of the United States of America, residing at Des Moines, in the county of Polk and State of Iowa, have invented certain new and useful Improvements in Methods of Producing Water-Softening Material, of which the following is a specification.

This invention relates to a method of producing a water softening material. It is known that certain substances occurring in nature as clays are capable when properly treated of softening water by base exchange. In other words, this material has the capacity, when the water to be softened is passed through a bed of such material, of taking up the calcium and magnesium, the presence of which in the water renders the water hard. After a certain amount of water has been softened it becomes necessary to regenerate the material and this is accomplished by passing a neutral solution of an alkali metal, preferably sodium or potassium chlorid through the bed of water softening material, which removes the calcium and magnesium from the material and renders it capable of again softening water by taking up the calcium and magnesium therein.

In order that, upon the start, the material may be in the best possible condition, it is desirable to initially regenerate the same, *i. e.*, to subject it to the action of sodium or potassium chlorid.

The present invention has to do particularly with the preparation of a water softening material from a material having aluminum silicate for its base.

The material, which at the present time I am using for this purpose, is found in Fall River county, South Dakota and has the following analysis:

|  | Per cent. |  |  |
|---|---|---|---|
| Comb. water (above 110° C.) | 3.00 | to | 7.00 |
| Moisture (below 110° C.) | 10.00 | " | 35.00 |
| $SiO_2$ | 40.00 | " | 60.00 |
| $Fe_2O_3$ | 2.00 | " | 4.00 |
| $MnO_2$ | Trace | " | 0.10 |
| $Al_2O_3$ | 16.00 | " | 25.00 |
| $TiO_2$ | Trace | " | 0.50 |
| $P_2O_2$ | Trace | " | 0.20 |
| $CaO_5$ | 0.50 | " | 4.90 |
| $MgO$ | 0.25 | " | 4.50 |
| $K_2O$ | Trace | " | 3.50 |
| $Na_2O$ | .35 | " | 5.00 |
| $SO_3$ | Trace | " | 1.00 |
| $Cl$ | Trace | " | .25 |
| $NO_3$ | Trace | to | .15 |
| $CO_2$ | Trace | " | 2.50 |
| $H_2S$ (free) | Trace | " | .04 |
| $FeS$ | Trace | " | .05 |

The constituents vary according to no fixed rule, being dependent upon local conditions.

However, I find that the best results are to be obtained by using a mineral of the following composition:

|  | Per cent. |
|---|---|
| Comb. water (above 110° C.) | 5.99 |
| Moisture (below 110° C.) | 11.65 |
| $SiO_2$ | 53.13 |
| $Fe_2O_3$ | 3.10 |
| $MnO_2$ | Trace |
| $Al_2O_3$ | 20.37 |
| $TiO_2$ | Trace |
| $P_2O_5$ | None |
| $CaO$ | 2.54 |
| $MgO$ | 2.16 |
| $K_2O$ | .04 |
| $Na_2O$ | .55 |
| $SO_3$ | .48 |
| $Cl$ | .10 |
| $NO_3$ | None |
| $CO_2$ | None |
| $H_2S$ | None |
| $FeS$ | None |
|  | 100.11 |

The use of material of this nature for the above named purpose is fully set forth in my co-pending application, Serial No. 98,993, filed May 20, 1916. As is fully set forth in the said application it has been found to be necessary to provide some means of preventing the material from being reduced to mud-like consistency by the action of water because in such condition it is practically impossible to force the water to be filtered through it. It has, therefore, been heretofore proposed to bake the material at a sufficiently high temperature to render it hard enough to resist the powdering action of water.

Because the constituents of the material vary more or less according to the location from which it is taken, the resultant product, heretofore, varied more or less in its water softening qualities and the present invention relates particularly to a process of treating the material in such manner as to secure an entirely homogeneous, finished product.

In carrying out the invention the material is reduced to a thin mud, either by drying, powdering, and mixing with water, or by levigation with suitable machinery and it is then treated with salt brine, (sodium chlorid) and a large part of the impurities removed. The mud is now concentrated by suitable means to a desired consistency, and forced under pressure through small screen-like openings which deliver the mineral in string-like particles, which are broken off at suitable lengths. The mineral is now dried, preferably slowly at first, at atmospheric temperature, and then rapidly by artificial means, and then baked at a temperature of from 600 to 700 degrees centigrade, or such temperature as will render the material hard enough to resist the powdering action of water.

The result of this treatment is that it comes out a harder and better product than by the methods heretofore employed, it being very much more porous and has double the capacity of softening water than the material heretofore employed has had. Furthermore, in this way a more uniform product is secured as each and every particle contains the same ingredients.

By mixing the salt with the material during the time it is in the condition of a pasty mass the salt reaches every part of the material and initially regenerates each and every part thereof, and the subsequent washing removes many impurities, such as calcium, magnesium, etc.

Furthermore the addition of the salt at this time simplifies the handling of the material and reduces the time required for the completion of the same.

Having described my invention what I claim is:—

1. The herein described process of producing a water softening material which consists of treating a natural clay containing such ingredients as to render it capable of softening water by base exchange by first reducing said clay to a condition of greater than normal plasticity by the addition of water and salt, then intimately mixing such material and salt to render the mass homogeneous throughout, and subsequently drying and baking said material until it is hard enough to resist the disintegrating action of the water.

2. The herein described process of producing a water softening material which consists of treating a natural clay containing such ingredients as to render it capable of softening water by base exchange by mixing said material with water and salt to reduce the whole to a pasty mass and to render the mass homogeneous, then permitting the material to dry and then baking the material until it is hard enough to resist the powdering action of water.

3. The herein described process of producing a water softening material which consists of treating a natural clay containing such ingredients as to render it capable of softening water by base exchange by mixing said material with water and salt to reduce the whole to a pasty mass and to render the mass homogeneous, then separating the material into pieces of predetermined size.

4. The herein described process of producing a water softening material which consists of treating a natural clay having such ingredients as to render it capable of softening water by base exchange by first reducing said material to a pasty mass by the addition of water, adding salt thereto, then passing the material through a separating means adapted to separate it into a plurality of parts and finally baking the material until it is hard enough to resist the powdering action of water.

5. The herein described process of producing a water softening material which consists of treating a natural clay having such ingredients as to render it capable of softening water by base exchange by first reducing said material to a pasty mass by the addition of water, adding salt thereto, then passing the material through a separating means adapted to separate it into a plurality of parts, then allowing the material to partially dry.

6. The herein described process of treating a water softening material which consists of treating a natural clay containing such ingredients as to render it capable of softening water by base exchange by first adding salt and water to the material and reducing the whole to a pasty, homogeneous mass, then allowing the material to partially dry, then expressing the material through a separating means to divide it into a plurality of parts, allowing the material to dry further and then baking the material until it is hard enough to resist the powdering action of water.

In testimony whereof I affix my signature in the presence of two witnesses.

GEORGE HENRY WIDNER.

Witnesses:
  G. W. PRATHER,
  R. A. DAWSON.